(12) United States Patent  
Smith et al.

(10) Patent No.: US 9,249,739 B2  
(45) Date of Patent: Feb. 2, 2016

(54) THROTTLE BEHAVIOUR

(71) Applicant: McLaren Automotive Limited, Woking, Surrey (GB)

(72) Inventors: Jonathan Smith, London (GB); Davide Bizzarri, Woking (GB); Davide Montosi, Woking (GB)

(73) Assignee: McLaren Automotive Limited, Woking (GB)

( * ) Notice: Subject to any disclaimer, the term of this patent is extended or adjusted under 35 U.S.C. 154(b) by 216 days.

(21) Appl. No.: 14/010,203

(22) Filed: Aug. 26, 2013

(65) Prior Publication Data

US 2014/0244134 A1    Aug. 28, 2014

(30) Foreign Application Priority Data

Feb. 26, 2013   (GB) .................................. 1303401.2

(51) Int. Cl.
| | |
|---|---|
| *F02D 11/00* | (2006.01) |
| *F02D 11/10* | (2006.01) |
| *B60K 26/04* | (2006.01) |
| *B60W 10/06* | (2006.01) |

(52) U.S. Cl.
CPC ................ *F02D 11/00* (2013.01); *B60K 26/04* (2013.01); *B60W 10/06* (2013.01); *F02D 11/105* (2013.01); *B60K 2026/046* (2013.01); *B60W 2540/10* (2013.01); *B60W 2540/106* (2013.01)

(58) Field of Classification Search
CPC ......... F02D 11/00; F02D 19/00; F02D 25/00; F02M 69/24
USPC .............. 701/84, 85, 101–106, 110; 123/319, 123/339.14, 339.19
See application file for complete search history.

(56) References Cited

U.S. PATENT DOCUMENTS

| | | | | |
|---|---|---|---|---|
| 4,332,226 | A  * | 6/1982 | Nomura et al. ................ | 123/494 |
| 4,646,697 | A  * | 3/1987 | Grob et al. ............... | 123/406.23 |
| 5,078,109 | A  * | 1/1992 | Yoshida et al. ................ | 123/350 |
| 6,134,498 | A | 10/2000 | Oba | |
| 6,371,884 | B1 | 4/2002 | Channing | |
| 2004/0074473 | A1* | 4/2004 | Okubo et al. ............. | 123/339.23 |
| 2009/0319158 | A1* | 12/2009 | Ando et al. .................... | 701/106 |
| 2011/0239984 | A1* | 10/2011 | Lee et al. ................ | 123/339.14 |
| 2011/0247587 | A1* | 10/2011 | Chen ........................ | 123/339.19 |
| 2012/0017870 | A1* | 1/2012 | Surnilla et al. ........... | 123/339.14 |
| 2012/0160211 | A1* | 6/2012 | Maki et al. ............... | 123/339.14 |

FOREIGN PATENT DOCUMENTS

DE      102012012637  A1    1/2013

OTHER PUBLICATIONS

European Patent Office, Extended European Search Report for Application No. 14156482.3, Jul. 23, 2014, 7 pages, Germany.

* cited by examiner

*Primary Examiner* — John Kwon  
*Assistant Examiner* — Johnny H Hoang  
(74) *Attorney, Agent, or Firm* — Alston & Bird LLP (57) ABSTRACT

A controller for controlling a power source in response to a throttle input, the throttle input representing the status of a throttle control in a range from a minimum state to a maximum state, the controller being configured to control the power source in dependence on both the current status of the throttle control and the current direction of change of that status between the maximum state and the minimum state.

16 Claims, 5 Drawing Sheets

THROTTLE BEHAVIOUR

CROSS-REFERENCE TO RELATED APPLICATIONS

This patent application claims priority to and the benefit of Great Britain Application No. GB 1303401.2, filed on Feb. 26, 2013, the contents of which are hereby incorporated by reference herein in their entirety.

BACKGROUND

1. Related Field

This invention relates to the operation of vehicle controls.

2. Related Art

In a vehicle such as an automobile, the driver can typically operate a control device to influence the power output of the vehicle. Conventionally this device takes the form of a pedal which is sprung upwards to a default position and can be depressed from that position by the driver's foot, but other devices such as hand-operated levers can be used for the same purpose. In older vehicles the control device was mechanically linked to a throttle valve that regulated the power output of the vehicle's engine, and for that reason the device is conventionally known as a throttle. However, in modern vehicles the throttle control normally controls the behaviour of the car as one of a number of electrical inputs to an engine control unit (ECU). The throttle control may also be known as an accelerator.

In a vehicle that is operated via an ECU, the ECU receives a number of inputs and processes those inputs in accordance with a pre-stored control strategy in order to form a series of outputs which regulate the operation of the vehicle. For illustration, in the case of a vehicle powered by an internal combustion engine the inputs could include throttle position, engine RPM (revolutions per minute), inlet air temperature and selected drive gear; and the outputs could include the amount of fuel to be dispensed into the engine's cylinders, the level of turbo boost to be applied and the engine's ignition timing. The pre-stored control strategy allows the ECU to determine, for a particular set of inputs, the output values that will be used to regulate the vehicle.

A commonly used control strategy is to establish a fixed relationship between throttle position and torque demand. With such a strategy, the torque demand can be determined in dependence on throttle position, so in response to the throttle position the engine can be regulated in such a way as to generate the appropriate level of torque. The outputs required to generate a given level of torque can be established when the vehicle is being designed.

Figure 1:
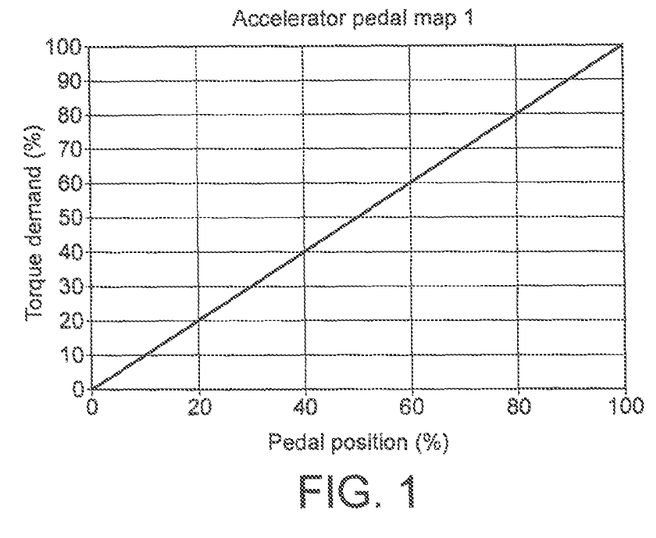
FIGS. 1 and 2 show examples of throttle maps.

One example of such a strategy is illustrated in FIG. 1. FIG. 1 shows a plot of throttle position on the X axis against torque demand on the Y axis. In FIG. 1 torque demand is expressed as a percentage of the maximum output torque of the engine. In this example there is a linear relationship between throttle position and torque demand. This relationship gives a smooth driving feel. To give a sportier driving feel a strategy such as that in FIG. 2 can be used. In this strategy the relationship between throttle position and torque demand is non-linear. A given change in throttle position causes a greater change in torque demand at lower throttle positions (region 1) (i.e. when the throttle is closer to its resting or low demand position) than at greater throttle positions (region 2) (i.e. when the throttle is further from its resting or low demand position).

Figure 2:
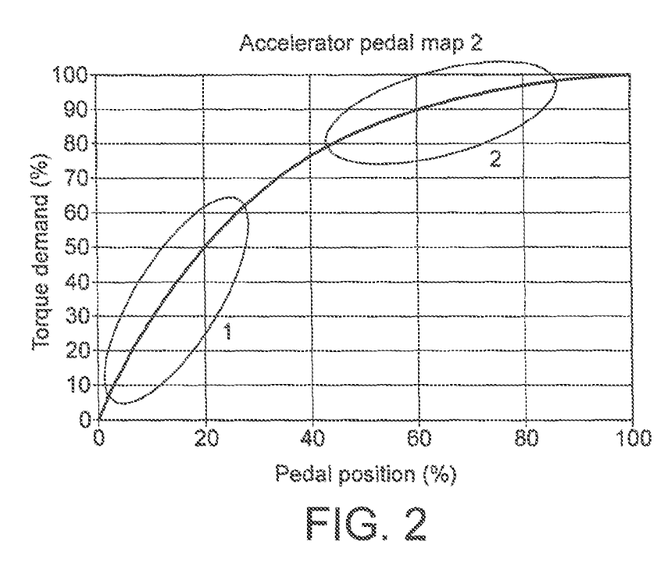

During an acceleration event where the throttle starts from a low or default (e.g. 0% travel) position, the strategy of FIG. 2 can makes a vehicle feel more responsive because a relatively large change in torque will be produced for small movements of the throttle from its starting position. However, during a deceleration event where the throttle starts from a high position it has the disadvantage that it can make the vehicle feel less responsive because a relatively small change in torque will be produced for small movements of the throttle from its starting position. If the driver has accelerated hard and has advanced the throttle to the 90% position, when he then releases the throttle to, say, the 60% position he will feel relatively little retardation of the vehicle.

There is a need for a way of controlling a vehicle that can provide a sporty feel for increasing throttle positions with a reduced associated loss of responsiveness for decreasing throttle positions.

BRIEF SUMMARY

According to the present invention there is provided a controller for controlling a power source in response to a throttle input, the throttle input representing the status of a throttle control in a range from a minimum state to a maximum state, the controller being configured to control the power source in dependence on both the current status of the throttle control and the current direction of change of that status between the maximum state and the minimum state.

The controller may control the power source by generating one or more outputs to the power source calculated to cause the power source to adopt a determined drive state in a range from a drive state of minimum output to a drive state of maximum output. The drive state of minimum output may be a state in which it outputs no power, or an idle state. In the idle state the power source could power a generator that generates charge current for a battery.

The controller may implement a first relationship between status of the throttle control and determined drive state when the current status of the throttle control is moving towards the maximum state. The controller may implement a second, different relationship between status of the throttle control and determined drive state when the current status of the throttle control is moving towards the minimum state.

The first relationship may be such that whilst the determined drive state is below the state of maximum output a change of a certain amount in the status of the throttle input causes a change of a certain amount in the determined drive state irrespective of the absolute value of the status of the throttle input.

The first relationship may be such that the rate of change of determined drive state with the status of the throttle input is such that the controller can cause the power source to adopt the drive state of maximum output when the status of the throttle input has not reached the maximum state.

The first relationship may be such that the rate of change of determined drive state with the status of the throttle input is constant.

The second relationship may be such that a change of a certain amount in the status of the throttle input causes a change of an amount in the determined drive state that is dependent on of the absolute value of the status of the throttle input.

The second relationship may be such that the rate of change of determined drive state with the status of the throttle input is such that the controller cannot cause the power source to adopt a drive state of minimum output until the status of the throttle input has reached the minimum state.

The second relationship may be such that the rate of change of determined drive state with the status of the throttle input is constant for a given combination of determined drive state and status of the throttle input at the time when the status of the throttle control began to move towards the minimum state.

The first and second modes may be such that the rate of change of determined drive state with the status of the throttle input is never greater in the second mode than the first mode.

The determined drive state may be a torque demand state.

According to a second aspect of the invention there is provided a vehicle comprising: a controller as set out above; the power source; and the throttle control.

The throttle control may be operable by a driver of the vehicle to adopt its status.

The throttle control may be a pedal.

The power source may include one or more of an internal combustion engine and an electric motor. The power source may be arranged for providing motive power to the vehicle.

According to a first exemplary claim, a controller is provided for controlling a power source in response to a throttle input, the throttle input representing the status of a throttle control in a range from a minimum state to a maximum state, the controller being configured to control the power source in dependence on both the current status of the throttle control and the current direction of change of that status between the maximum state and the minimum state.

According to a second claim, in the method of the above-described first claim, the controller controls the power source by generating one or more outputs to the power source calculated to cause the power source to adopt a determined drive state in a range from a drive state of minimum output to a drive state of maximum output.

According to a third claim, in the method of the above-described second claim, the controller implements a first relationship between status of the throttle control and determined drive state when the current status of the throttle control is moving towards the maximum state and a second, different relationship between status of the throttle control and determined drive state when the current status of the throttle control is moving towards the minimum state.

According to a fourth claim, in the method of the above-described third claim, the first relationship is such that whilst the determined drive state is below the state of maximum output a change of a certain amount in the status of the throttle input causes a change of a certain amount in the determined drive state irrespective of the absolute value of the status of the throttle input.

According to a fifth claim, in the method of the above-described fourth claim, the first relationship is such that the rate of change of determined drive state with the status of the throttle input is such that the controller can cause the power source to adopt the drive state of maximum output when the status of the throttle input has not reached the maximum state.

According to a sixth claim, in the method of the above-described fifth claim, the first relationship is such that the rate of change of determined drive state with the status of the throttle input is constant.

According to a seventh claim, in the method of any of the above described third through sixth claims, the second relationship is such that a change of a certain amount in the status of the throttle input causes a change of an amount in the determined drive state that is dependent on of the absolute value of the status of the throttle input.

According to an eighth claim, in the method of the above-described seventh claim, the second relationship is such that the rate of change of determined drive state with the status of the throttle input is such that the controller cannot cause the power source to adopt a drive state of minimum output until the status of the throttle input has reached the minimum state.

According to a ninth claim, in the method of the above-described eighth claim, the second relationship is such that the rate of change of determined drive state with the status of the throttle input is constant for a given combination of determined drive state and status of the throttle input at the time when the status of the throttle control began to move towards the minimum state.

According to a tenth claim, in the method of any of the above-described third through ninth claims, the first and second modes are such that the rate of change of determined drive state with the status of the throttle input is never greater in the second mode than the first mode.

According to an eleventh claim, in the method of any of the above-described second through tenth claims, the determined drive state is a torque demand state.

According to a twelfth claim, a vehicle is provided, comprising: a controller as claimed in any of the preceding first through eleventh claims; the power source; and the throttle control.

According to a thirteenth claim, a vehicle as described in the twelfth claim, wherein the throttle control is operable by a driver of the vehicle to adopt its status.

According to a fourteenth claim, a vehicle as described in the thirteenth claim, wherein the throttle control is a pedal.

According to a fifteenth claim, a vehicle as described in any of the twelfth through the fourteenth claims, wherein the power source includes one or more of an internal combustion engine and an electric motor and the power source is arranged for providing motive power to the vehicle.

According to a sixteenth claim, a controller or a vehicle substantially as herein described with reference to FIGS. 3 to 5E of the accompanying drawings.

According to a third aspect of the present invention there is provided a method of controlling a power source, the method comprising: receiving a throttle input, the throttle input representing the status of a throttle control in a range from a minimum state to a maximum state; determining based on the throttle input a power source control signal, the power source control signal being determined in dependence on both the current status of the throttle control as indicated by the throttle input and the current direction of change of that status between the maximum state and the minimum state; and providing the power source control signal to a power source so as to control the drive state of the power source.

The step of determining the power source control signal may be performed by a controller.

The controller may have a processor for receiving the throttle input. The processor may be configured to operate in accordance with a computer program stored in non-transitory form on a machine readable storage medium. The computer program may store instructions for causing the processor to perform the determination step and/or the control and/or the calculation in the manner described herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The throttle maps to be described below define relationships between (a) the position of a throttle control and (b) drive demand. In these relationships the drive demand is additionally dependent on the direction in which the throttle control is being moved and/or on one or more previous positions of the pedal within its range of movement. This has the effect that for a single position of the throttle control different drive demands can be output from the relationships depending on the history of movement of the throttle prior to reaching that position.

Figure 3:
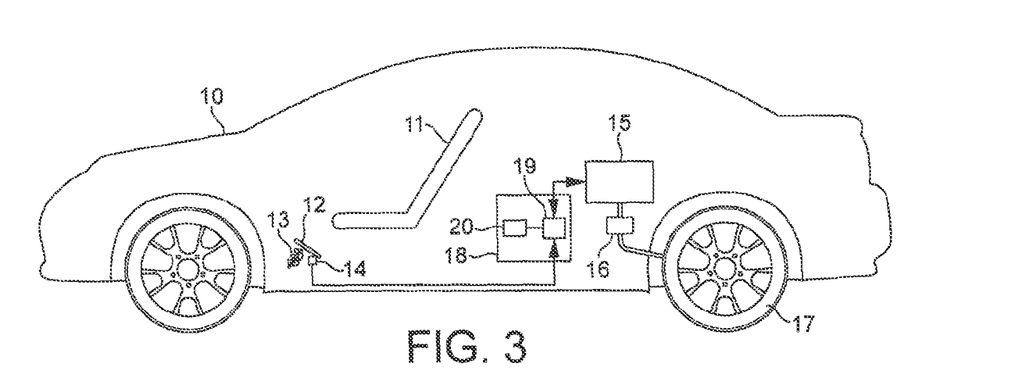
FIG. 3 is a schematic illustration of a vehicle.

FIG. 3 illustrates a vehicle. The vehicle comprises a body 10. Within the body is a seat 11 for a driver. When a driver is sat in the seat 11 he can reach a throttle pedal 12 with his foot. The throttle pedal is pivotable about its rearmost end relative to the body of the vehicle. Its forward end is biased upwardly by spring 13 to an uppermost position where it hits a stop, and can be pressed down by the driver's foot to a lowermost position where it hits another stop. The pedal is thus constrained to be movable only between the uppermost position ("0%") and the lowermost position ("100%"). A position detector 14 is attached to the pedal and senses the angle of deflection of the pedal.

In this example the vehicle has an internal combustion engine 15. The engine provides a mechanical drive to a gearbox 16 which in turn provides mechanical drive to one or more drive wheels 17 of the vehicle. The vehicle could alternatively be driven by other power sources, as will be described in more detail below.

The operation of the engine 15 is regulated by an ECU 18. The ECU comprises a processor 19 and a non-volatile memory 20. The memory stores a set of program instructions that are executable by the processor, and reference data such as look-up tables that can be referenced by the processor in response to those instructions. The ECU is coupled to the position detector 14 to receive from it the detected position of the throttle pedal. The ECU is coupled to the engine to receive from it data relating to the operation of the engine, such as current RPM and inlet air temperature, and to transmit to the engine control information that will regulate the operation of the engine. That control information could, for example, include the amount of fuel and/or air to be charged in each inlet stroke, valve and ignition timings and turbo boost level.

The program instructions stored by the memory define a mechanism whereby the ECU can determine a set of output parameters for controlling the engine in response to a set of input parameters it has received and/or computed. In the present example, the ECU follows a two-stage process to determine the output parameters. First, in response to at least some of the input parameters (including throttle position and a representation of throttle direction) the ECU determines a target drive demand from the engine. The drive demand can conveniently be a torque demand, but it could be expressed in other ways such as power demand or fuel burned per unit time. Second, using a pre-stored model of the behaviour of the engine the ECU determines the outputs needed to cause the engine to satisfy that drive demand. It then transmits those outputs to the engine to cause the engine to behave in accordance with the computed drive demand. These stages are repeated frequently: typically 20 or more times per second, to generate a series of output values reflecting up-to-date input values.

The ECU could perform the first stage of processing using a map. The map could be stored in the memory 20 as a look-up table that allows the ECU to look up the required drive demand for a particular set of input parameters. Alternatively or in addition the map could be stored as one or more functions that mathematically interrelate the input parameters and that can be evaluated in real time to determine the output parameters.

As indicated above, one of the input parameters is the direction of motion of the throttle immediately prior to reaching its present position. With a suitable pedal sensor 14 that parameter could be received directly from the sensor. Alternatively, it could be computed by the ECU comparing the current throttle position with the last received throttle position that was different from the current position. For this purpose the instructions in the ECU program could cause the ECU processor to store data on the history of the throttle position. That historic data could be stored in the processor itself or in a memory associated with it. That historic data could include, for example, the throttle position when it last changed direction, or the last n throttle samples, where n could, for example, be less than 20, 50 or 100. Any or all of such stored historic data could be used as an input in the ECU program to determine drive demand.

Figure 4:
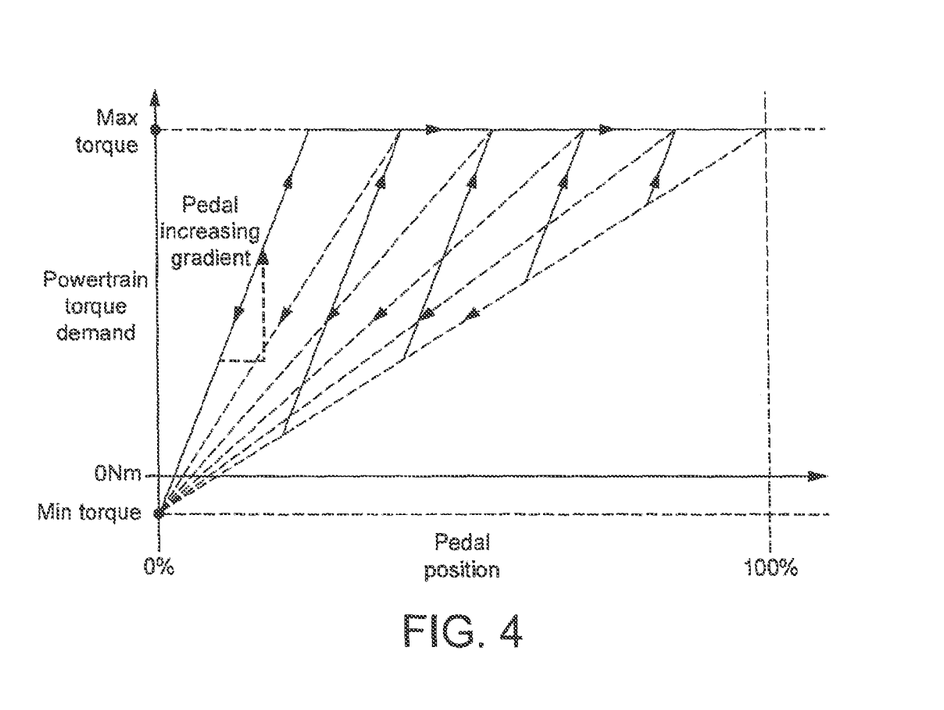
FIG. 4 illustrates another throttle map.

FIG. 4 illustrates one example of a throttle map that is dependent on the throttle's direction of motion. For clarity, FIG. 4 only indicates some illustrative examples of behaviour. Solid lines indicate a relationship between throttle position and drive demand (in this case torque demand) when the throttle is moving in the sense of increasing deflection from its default position ("increasing throttle"). Dashed lines indicate a relationship between throttle position and drive demand when the throttle is moving in the sense of decreasing deflection from its default position ("decreasing throttle"). As indicated in FIG. 4, the gradient of the line that interrelates throttle position and torque demand is different for increasing throttle than for decreasing throttle. Specifically, (and except when maximum demand has been reached) the gradient is greater for increasing throttle than for decreasing throttle.

The behaviour illustrated in FIG. 4 operates in the following way. When throttle position is increased, torque demand increases as a function of throttle position on a first gradient $G_1$ until motion of the throttle stops or reverses or until torque demand reaches the maximum possible torque demand (100%). Further increases of throttle position once torque demand has reached its maximum ("saturated") will not affect torque demand. When throttle position is decreased, torque demand decreases as a function of throttle position on a second gradient $G_D$. For any particular stroke of the throttle towards decreasing throttle position $G_D$ is defined such that if the throttle position is decreased continuously to its default (0%) position torque demand will reach a set minimum torque value when throttle position reaches 0%.

The minimum torque value for the purpose of computing drive demand ("0%") could be zero, or zero torque as applied to the drive output of the vehicle. Alternatively it could be a pre-set minimum or idle torque. Conveniently it is the lowest torque that the engine produces during operation of the vehicle. As illustrated in FIG. 4, the minimum torque could be negative.

In this example gradient $G_1$ is a constant. This has the advantage of providing the driver with a sensation of consistent pedal feel under acceleration. However, gradient $G_1$ could vary depending on throttle position and/or other inputs such as a driver-selected operating mode. In this example the map provides for a linear relationship between throttle position and drive demand for a particular stroke of the throttle towards increasing throttle position. However, that relationship could be non-linear. Preferably that relationship is monotonic, with increasing throttle position leading to increasing drive demand, otherwise a peculiar driving feel would be experienced.

In this example the algorithm is such that $G_1$ cannot be greater than any possible value of $G_D$. This leads to a particularly sporty driving feel. Other regimes are possible, however. For example, in the regime of FIG. 4 it is possible for drive demand to have saturated at 100% for values of throttle position below 100%. Then further increases in throttle position have no effect on drive demand. If this was felt to be undesirable then as drive demand approached 100% then a reduced gradient could be applied. For a sporty feel preferably $G_1$ is greater than all possible values of $G_D$ whenever drive demand is less than a certain percentage (e.g. 70%, 80% or 90%) of its maximum.

In this example the map provides for a linear relationship between throttle position and drive demand for a particular stroke of the throttle towards decreasing throttle position. This has the advantage of providing the driver with a sensation of consistent pedal feel under deceleration or lift-off. However, that relationship could be non-linear. Preferably that relationship is monotonic, with decreasing throttle position leading to decreasing drive demand, otherwise a peculiar driving feel would be experienced. Preferably the relationship between throttle position and drive demand is such that when throttle position is being reduced and reaches 0% drive demand reaches its minimum at the same time. This can give the driver a sensation of consistent behaviour under deceleration or lift-off.

The behaviour illustrated in FIG. 4 can be represented by the following pseudocode, where: $t_n$ is the current throttle position, $t_x$ is the throttle position when it last reversed direction, g is a constant representing $G_1$, $D_n$ is output torque demand represented on a scale of 0 to 100 and $D_x$ is the output torque at the time of the last reversal of throttle direction. $D_x$ and $t_x$ could be held by the ECU processor, g could be programmed into the instructions for the ECU processor and $t_n$ is received from the throttle sensor.

| | |
|---|---|
| if $t_n > t_x$ | \\ throttle position is increasing |
| $D_n = \min(100, D_x + (t_n - t_x) * g)$ | |
| elseif $t_n < t_x$ | \\ throttle position is decreasing |
| $h = D_x / t_x$ | \\ determine h representing $G_D$ |
| $D_n = D_x - (t_x - t_n) * h$ | |
| else | \\ throttle position is unchanged |
| $D_n = D_x$ | |

Figure 5A:
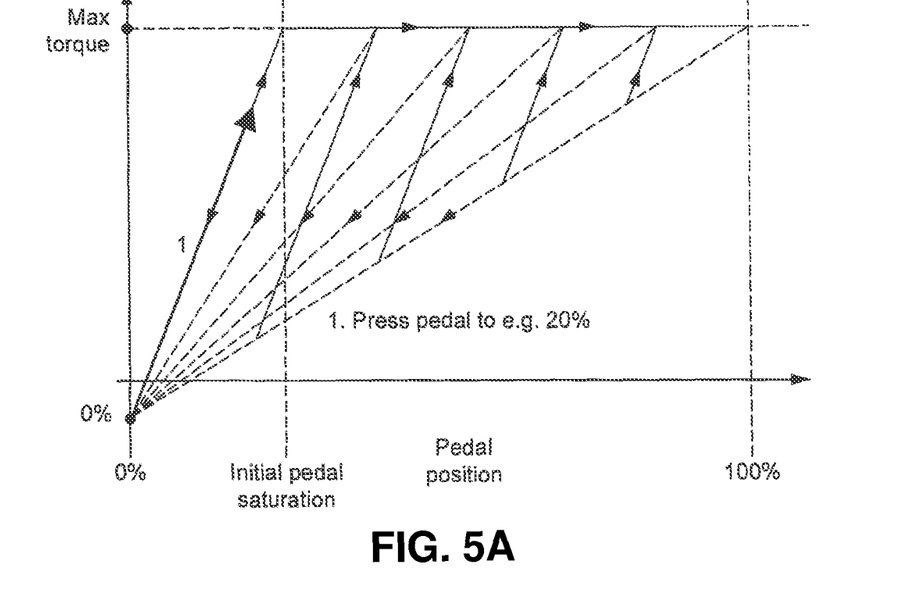
FIGS. 5A-E illustrate various stages in the operation of the map of FIG. 4.
Figure 5B:
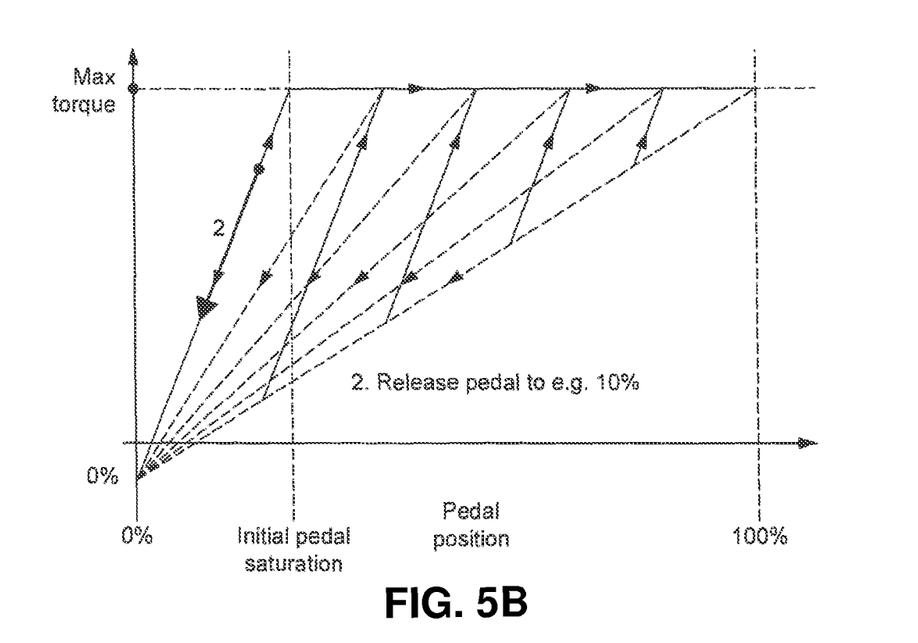
Figure 5C:
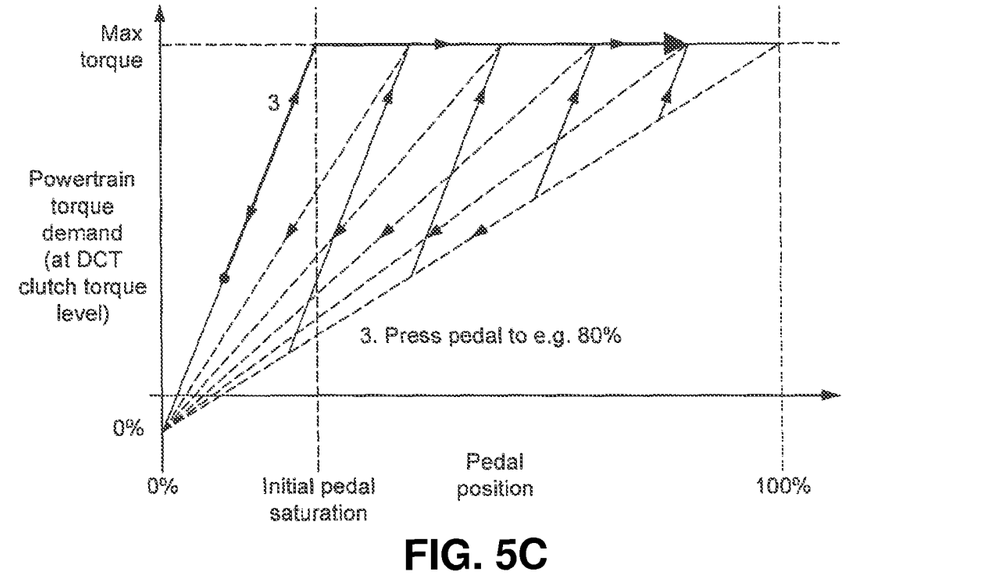
Figure 5D:
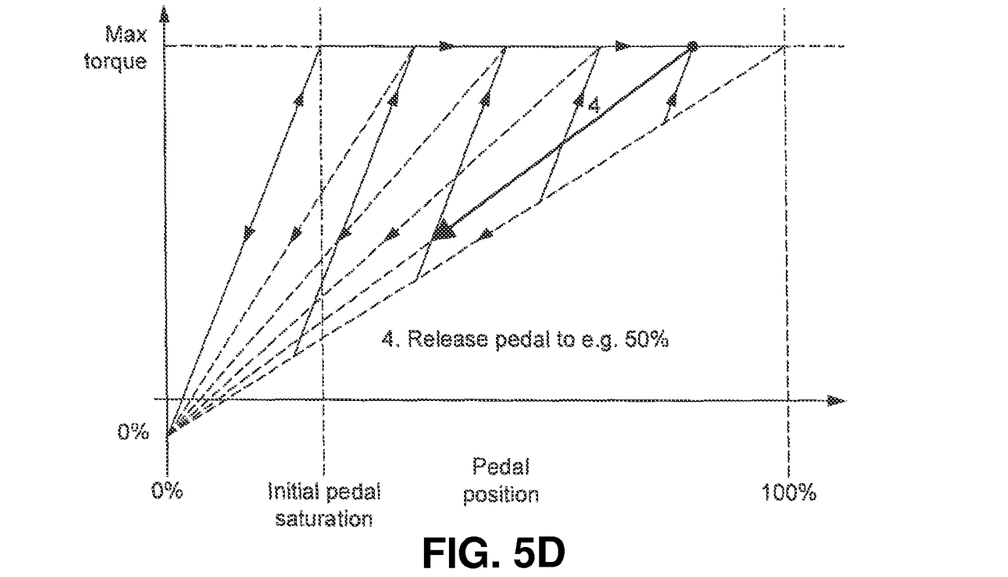
Figure 5E:
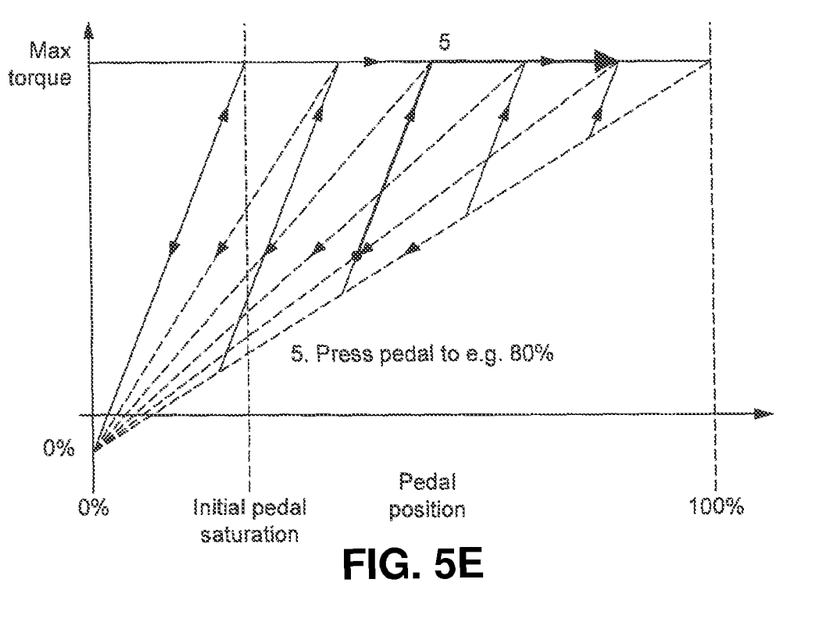

FIGS. 5A-E illustrate the behaviour of FIG. 4.
6. As illustrated in FIG. 5A the system is initially at the origin (0% throttle, 0% torque demand). In a first step the driver presses the throttle to the 20% position. This causes the torque demand to move as illustrated in FIG. 5A.
7. In a second step the driver releases the throttle to the 10% position. This causes the torque demand to move as illustrated in FIG. 5B. Because the end-point of the first step had been reached by an increase from the origin, the reverse path as illustrated in FIG. 5b is on the same line as the increasing path.
8. In a third step the driver increases the throttle to the 80% position. This causes the torque demand to move as illustrated in FIG. 5C. The torque demand changes linearly with throttle motion until it is saturated at 100%. Further motion of the throttle in the same direction does not alter torque demand.
9. In a fourth step the driver releases the throttle to the 50% position. This causes the torque demand to move as illustrated in FIG. 5D. In this step the torque demand moves on a line that intersects the end-point of the third step (at which the pedal was released) and the origin.
10. In a fifth step the driver increases the throttle to the 80% position. This causes the torque demand to move as illustrated in FIG. 5E. The torque demand changes linearly with throttle motion until it is saturated at 100%. Further motion of the throttle in the same direction does not alter torque demand.

Once the ECU has determined the drive demand, for example the torque demand, in a second step it can determine the outputs required to cause the vehicle's power source (e.g. its engine) to generate the required torque. The ECU could be pre-programmed with the outputs necessary to generate a particular torque. For example, they could be stored in a look-up table in memory 20. Alternatively, they could be determined algorithmically. In an alternative embodiment, the ECU could determine the outputs in a single step, without going via a specifically calculated drive demand. In that case, the ECU could store look-up tables and/or algorithms for generating the outputs directly from inputs including throttle position and a representation of throttle direction.

In the embodiment described above there is a single form of behaviour. The gradients employed in that behaviour could be seen as being characterised by the maximum torque and the pre-defined gradient $G_1$ for increasing torque. The ECU could be capable of operating in two or more modes, with one or more of those characterising values being different as between the various modes. For example, the vehicle could have a "city" mode in which the torque saturates at a value less than the maximum torque available from the engine and/or in which $G_1$ is less than in a sport mode. The driver may be able to select between these modes. Furthermore, the ECU may be capable of automatically deciding to operate in one of multiple such modes. It could do so in dependence on the driver's behaviour, for example by engaging a sportier mode (with higher saturation torque and/or steeper $G_1$) when it detects that the driver is driving more enthusiastically, and vice versa. It could do so in dependence on instantaneous operating parameters of the vehicle, for example by determining which of a plurality of operating modes to employ in dependence on the current RPM of the vehicle.

In the embodiment described above the vehicle is powered by an internal combustion engine (ICE). The vehicle could be driven in another way. For example it could be a hybrid vehicle in which an ICE is supplemented by another power source such as an electric motor, or it could be an electric only vehicle. In each case the ECU can control the power source, or each power source, to arrange that it or they in combination provide the desired drive in response to throttle position.

When output demand is minimal the power source could produce no output torque. Alternatively, it could produce an idle torque. The idle torque could be harnessed to charge a battery of the vehicle. The vehicle can be configured so that when output demand is minimal, no power from the power source is directed to driving motion of the vehicle at that time.

The physical position of the throttle can be translated to a mathematical representation of throttle position in various ways. For example, it could be based on the angular position of the throttle or the linear position of the throttle between its limit stops. The mathematical representation of throttle position need not be a linear representation of either angular or linear position but should vary monotonically with physical position of the throttle.

The throttle control could be a pedal, as described above, or another device such as a lever or a virtual control on a touch-screen. The limits of the throttle as used for the operation of the control strategy described above could be the same as or different from the physical limits of movement of the throttle. For example, the throttle could have a kick-down position beyond the position treated as 100% for the purposes of the control strategy. The throttle control might not move relative to the body of the vehicle but might instead be fixed in position and the throttle input could be determined as the force applied by the driver to the control.

The throttle control could be for controlling a machine other than a vehicle, for example a tool. The throttle control could be for controlling a virtual machine, such as a car in a video game. In that case the throttle control could be a trigger of a games controller and the control of the behaviour of the virtual vehicle could be implemented using the principles described above by means of a games console.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

That which is claimed:

1. A controller for controlling a power source in response to a throttle input, the throttle input representing a status of a throttle control in a range from a minimum state of the throttle control to a maximum state of the throttle control, the controller being configured to control the power source in dependence on both the current status of the throttle control and the current direction of change of that status between the maximum state of the throttle control and the minimum state of the throttle control, wherein:
   the controller controls the power source by generating one or more outputs to the power source calculated to cause the power source to adopt a determined drive state in a range from a drive state of minimum output to a drive state of maximum output;
   the controller implements a first relationship between status of the throttle control and determined drive state when the current status of the throttle control is moving towards the maximum state and a second, different relationship between status of the throttle control and determined drive state when the current status of the throttle control is moving towards the minimum state; and
   the controller implements the first and second relationships so that the rate of change of determined drive state with the status of the throttle input is less in the second relationship than the first relationship.

2. A controller as claimed in claim 1, wherein the controller implements the first relationship in a manner that, whilst the determined drive state is below the state of maximum output, a change of a certain amount in the status of the throttle input causes a change of a certain amount in the determined drive state irrespective of the absolute value of the status of the throttle input.

3. A controller as claimed in claim 2, wherein the controller implements the first relationship in a manner that the rate of change of determined drive state with the status of the throttle input is such that the controller can cause the power source to adopt the drive state of maximum output when the status of the throttle input has not reached the maximum state.

4. A controller as claimed in claim 3, wherein the controller implements the first relationship in a manner that the rate of change of determined drive state with the status of the throttle input is constant.

5. A controller as claimed in claim 1, wherein the controller implements the second relationship in a manner that a change of a certain amount in the status of the throttle input causes a change of an amount in the determined drive state that is dependent on of the absolute value of the status of the throttle input.

6. A controller as claimed in claim 5, wherein the controller implements the second relationship in a manner that the rate of change of determined drive state with the status of the throttle input is such that the controller cannot cause the power source to adopt a drive state of minimum output until the status of the throttle input has reached the minimum state.

7. A controller as claimed in claim 6, wherein the controller implements the second relationship in a manner that the rate of change of determined drive state with the status of the throttle input is constant for a given combination of determined drive state and status of the throttle input at the time when the status of the throttle control began to move towards the minimum state.

8. A controller as claimed in claim 1, wherein the determined drive state is a torque demand state.

9. A vehicle comprising:
   a power source;
   a throttle control; and
   a controller for controlling the power source in response to the throttle input, wherein:
     the throttle input represents the status of a throttle control in a range from a minimum state of the throttle control to a maximum state of the throttle control;
     the controller controls the power source in dependence on both the current status of the throttle control and the current direction of change of that status between the maximum state and the minimum state;
     the controller controls the power source by generating one or more outputs to the power source calculated to cause the power source to adopt a determined drive state in a range from a drive state of minimum output to a drive state of maximum output;
     the controller implements a first relationship between status of the throttle control and determined drive state when the current status of the throttle control is moving towards the maximum state and a second, different relationship between status of the throttle control and determined drive state when the current status of the throttle control is moving towards the minimum state; and
     the controller implements the first and second relationships so that the rate of change of determined drive state with the status of the throttle input is less in the second relationship than the first relationship.

10. A vehicle as claimed in claim 9, wherein the throttle control is operable by a driver of the vehicle to adopt its status.

11. A vehicle as claimed in claim 10, wherein the throttle control is a pedal.

12. A vehicle as claimed in claim 9, wherein the power source includes one or more of an internal combustion engine and an electric motor and the power source is arranged for providing motive power to the vehicle.

13. A method of controlling a power source, the method comprising:
receiving a throttle input, the throttle input representing a status of a throttle control in a range from a minimum state of the throttle control to a maximum state of the throttle control;
determining based on the throttle input a power source control signal, the power source control signal being determined in dependence on both the current status of the throttle control as indicated by the throttle input and the current direction of change of that status between the maximum state of the throttle control and the minimum state of the throttle control; and
providing the power source control signal to a power source so as to control the drive state of the power source,
wherein:
said determining step comprises determining the control signal so as to implement a first relationship between status of the throttle control and drive state of the power source when the current status of the throttle control is moving towards the maximum state and a second, different relationship between status of the throttle control and drive state of the power source when the current status of the throttle control is moving towards the minimum state; and
the first and second relationships are implemented so that the rate of change of drive state of the power source with the status of the throttle input is less in the second relationship that the first relationship.

14. A method as claimed in claim 13, wherein the controller implements the first relationship in a manner that whilst the drive state of the power source is below a state of maximum output of the power source a change of a certain amount in the status of the throttle control causes a change of a certain amount in the drive state of the power source irrespective of the absolute value of the status of the throttle control.

15. A method as claimed in claim 14, wherein the controller implements the first relationship in a manner that the rate of change of drive state of the power source with the status of the throttle control is such that the power source adopts the drive state of maximum output when the status of the throttle control has not reached the maximum state.

16. A method as claimed in claim 15, wherein the controller implements the first relationship in a manner that the rate of change of drive state of the power source with the status of the throttle input is constant.

* * * * *